United States Patent
Sayem et al.

(10) Patent No.: US 10,916,856 B1
(45) Date of Patent: Feb. 9, 2021

(54) DUAL BAND QUADRIFILAR HELIX ANTENNA

(71) Applicant: Garmin Switzerland GmbH, Schaffhausen (CH)

(72) Inventors: Abu T. Sayem, Overland Park, KS (US); Henry J. Straub, Olathe, KS (US)

(73) Assignee: Garmin Switzerland GmbH

( * ) Notice: Subject to any disclaimer, the term of this patent is extended or adjusted under 35 U.S.C. 154(b) by 0 days.

(21) Appl. No.: 16/593,778

(22) Filed: Oct. 4, 2019

(51) Int. Cl.
| | |
|---|---|
| *H01Q 11/08* | (2006.01) |
| *H01Q 1/24* | (2006.01) |
| *G01S 19/35* | (2010.01) |
| *H01Q 1/38* | (2006.01) |
| *H01Q 21/24* | (2006.01) |
| *H01Q 1/36* | (2006.01) |

(52) U.S. Cl.
CPC .............. *H01Q 11/08* (2013.01); *G01S 19/35* (2013.01); *H01Q 1/242* (2013.01); *H01Q 1/362* (2013.01); *H01Q 1/38* (2013.01); *H01Q 21/24* (2013.01)

(58) Field of Classification Search
CPC ................................ H01Q 1/36; H01Q 11/08
See application file for complete search history.

(56) References Cited

U.S. PATENT DOCUMENTS

| | | | |
|---|---|---|---|
| 5,872,549 A | 2/1999 | Huynh et al. | |
| 6,421,028 B1 | 7/2002 | Öhgren et al. | |
| 6,480,173 B1 | 11/2002 | Marino | |
| 7,079,079 B2* | 7/2006 | Jo | H01Q 1/243 343/700 MS |
| 7,999,755 B2 | 8/2011 | Licul et al. | |
| 8,681,070 B2* | 3/2014 | DiNallo | H01Q 3/26 343/895 |
| 8,884,822 B2 | 11/2014 | Dinallo | |
| 9,190,718 B2 | 11/2015 | Dinallo et al. | |
| 9,343,796 B2 | 5/2016 | Yang et al. | |
| 9,502,776 B2 | 11/2016 | Nallo et al. | |

(Continued)

OTHER PUBLICATIONS

Elliot, P. G., et al. "Novel Quadrifilar Helix Antenna Combining GNSS, Iridium, and a UHF Communications Monopole" from https://www.mitre.org/publications/technical-papers?body_value= antenna, published prior to Oct. 4, 2019.

(Continued)

*Primary Examiner* — Hasan Z Islam
(74) *Attorney, Agent, or Firm* — Samuel M. Korte; Max M. Ali (57) ABSTRACT

A dual-band antenna assembly for use with an electronic device comprises a substrate and first, second, third, and fourth antenna filar elements. The substrate includes a side wall forming a cylindrical shape. The first, second, third, and fourth antenna filar elements are positioned diagonally on the side wall and equally separated from one another. Each antenna filar element includes a first arm configured to receive wireless signals in a first frequency band and a second arm electrically connected to the first arm, positioned adjacent to the first arm, and configured to receive wireless signals in a second frequency band. The first arm has a length that is greater than a length of the second arm and has a portion which wraps around the second end of the second arm thereby capacitively coupling the portion of the first arm with the second arm.

18 Claims, 7 Drawing Sheets

(56) References Cited

U.S. PATENT DOCUMENTS

| | | | |
|---|---|---|---|
| 9,899,731 B1* | 2/2018 | Klein | H01Q 1/36 |
| 9,905,932 B2 | 2/2018 | Dinallo | |
| 10,199,733 B1 | 2/2019 | Dinallo | |
| 10,700,430 B1* | 6/2020 | Abbasi | H01Q 3/40 |
| 2005/0243014 A1* | 11/2005 | Bryan, Jr. | H01Q 1/36 |
| | | | 343/895 |
| 2019/0245268 A1* | 8/2019 | Packer | H01Q 1/362 |
| 2020/0067194 A1* | 2/2020 | Haarakangas | H01Q 5/307 |

OTHER PUBLICATIONS

Lamensdorf, D., et al. "Dual-Band Quadrifilar Helix Antenna." from https://www.mitre.org/publications/technical-papers?body_value=antenna, published prior to Oct. 4, 2019.

Printout from https://www.gpsworld.com/tallysman-adds-3-more-to-helical-antenna-line/, published prior to Oct. 4, 2019.

Printout from https://www.gpsworld.com/tallysman-releases-new-uav-helical-gnss-antennas/ published prior to Oct. 4, 2019.

Rabemanantsoa, Josh, and Ala Sharaiha. "Small-Folded, Printed Quadrifilar Helix Antenna for GPS Applications." 2010 14th International Symposium on Antenna Technology and Applied Electromagnetics & the American Electromagnetics Conference, 2010, doi:10.1109/antem.2010.5552579.

Uniden Mystic handheld VHF/GPS Owner's Manual, published Oct. 22, 2003.

* cited by examiner

DUAL BAND QUADRIFILAR HELIX ANTENNA

BACKGROUND

A handheld mobile navigation electronic device is typically utilized by people walking, biking, hiking, backpacking, camping, mountain climbing, geocaching, or the like. The electronic device includes an antenna, a location determining element, and a screen. The antenna receives a global navigation satellite system (GNSS) signal and communicates it to the location determining element which processes the signal in order to determine a geolocation of the device. The screen displays the geolocation on a map to help the user know his location in relation to geographic surroundings. When the electronic device is utilized in locations that include buildings, rock formations, cliff faces, or other structures with large flat surfaces, the GNSS signal often reflects off of the surfaces. The reflections are received by the antenna in addition to the antenna receiving the GNSS signal directly. This situation creates interference which greatly decreases the accuracy of the determination of the geolocation. In other words, the location determining element may determine that the electronic device is at a particular location when the electronic device is actually at a different location, perhaps dozens of feet away.

SUMMARY

Embodiments of the present technology provide a handheld mobile navigation electronic device with a dual-band antenna assembly that improves the accuracy of the determination of a geolocation of the electronic device. An embodiment of the antenna assembly broadly comprises a substrate and first, second, third, and fourth antenna filar elements. The substrate includes a side wall forming a cylindrical shape. The first, second, third, and fourth antenna filar elements are positioned diagonally on the side wall of the substrate and are equally separated from one another. Each antenna filar element is formed from electrically conductive material and includes a first arm and a second arm. The first arm is configured to receive wireless signals in a first frequency band. The second arm is electrically connected to the first arm, positioned adjacent to the first arm, and configured to receive wireless signals in a second frequency band. The first arm has a length that is greater than a length of the second arm. The first arm also has a portion which wraps around one end of the second arm thereby capacitively coupling the portion of the first arm with the second arm.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

Embodiments of the present technology relate to a handheld mobile navigation electronic device. These types of devices are used by people to help them know their location in relation to geographic surroundings (i.e., their geolocation) while they are engaged in outdoor activities such as walking, biking, hiking, backpacking, camping, mountain climbing, geocaching, or the like. The devices are configured to receive a global navigation satellite system (GNSS) wireless signal, which is decoded to determine the geolocation of the device. Embodiments of the present electronic device are configured to receive the global positioning system (GPS) L1 band and the L5 band signals to determine its geolocation. The GPS signals from GPS satellites at both L1 and L5 bands are transmitted using right-hand circular polarization. In addition, the L1 band signal has a 1.5% fractional bandwidth, FBW (1563-1587 MHz) requirement, while the L5 band signal has a 2.1% FBW (1164-1189 MHz) requirement.

The electronic device includes, among others, a housing, a display, a location determining element, and an antenna assembly. The housing retains the other components. The display displays a variety of information including the geolocation on a map. The location determining element determines the geolocation of the electronic device from the L1 band data and the L5 band data. The antenna assembly converts the GPS L1 band signal and L5 band signal into an electronic signal that includes an L1 band signal component and an L5 band signal component. The antenna assembly includes four antenna filar elements positioned on a cylindrical substrate in a quad helical configuration, which results in the antenna assembly being able to receive the right-hand circular polarization of the GPS signals. In addition, each antenna filar element includes a first arm configured to receive the GPS L5 band and a second arm configured to receive the GPS L1 band. Furthermore, a portion the first arm of each antenna filar element is wrapped around one end of the second arm on the surface of the substrate. This physical layout of the two arms results in capacitive coupling of the arms, which allows the antenna assembly to output the electronic signal such that the L1 band signal component and the L5 band signal component each have the appropriate bandwidth—that is, the L1 band signal component has at least 1.5% fractional bandwidth, and the L5 band signal component has at least 2.1% fractional bandwidth.

Embodiments of the technology will now be described in more detail with reference to the drawing figures. Referring initially to FIGS. 1-4, a handheld mobile navigation electronic device 10 is illustrated which includes a dual-band antenna assembly that improves the accuracy of the determination of a geolocation of the electronic device 10. The electronic device 10 broadly comprises a housing 12, a display 14, a user interface 16, a location determining element 18, a first hybrid coupler 20, a second hybrid coupler 22, a third hybrid coupler 24, a plurality of antenna match elements 26, a printed circuit board 28, and the antenna assembly 30.

The housing 12, as shown in FIGS. 1A-1B and FIGS. 3-4, generally houses or retains other components of the electronic device 10 and includes a top wall 32, a bottom wall 34, a front wall 36, a back wall 38, a left side wall 40, and a right side wall 42. The walls are connected to one another to form roughly a box shape with an internal cavity. The walls are typically manufactured from electrically nonconductive material such as rubbers or polymers that are generally impact resistant. The housing 12 further includes a cap 44 comprising one or more side walls and a top wall with a hollow interior. The cap 44 is coupled to the top wall 32 of the housing 12 and provides protection for the antenna assembly 30.

Figure 1A:
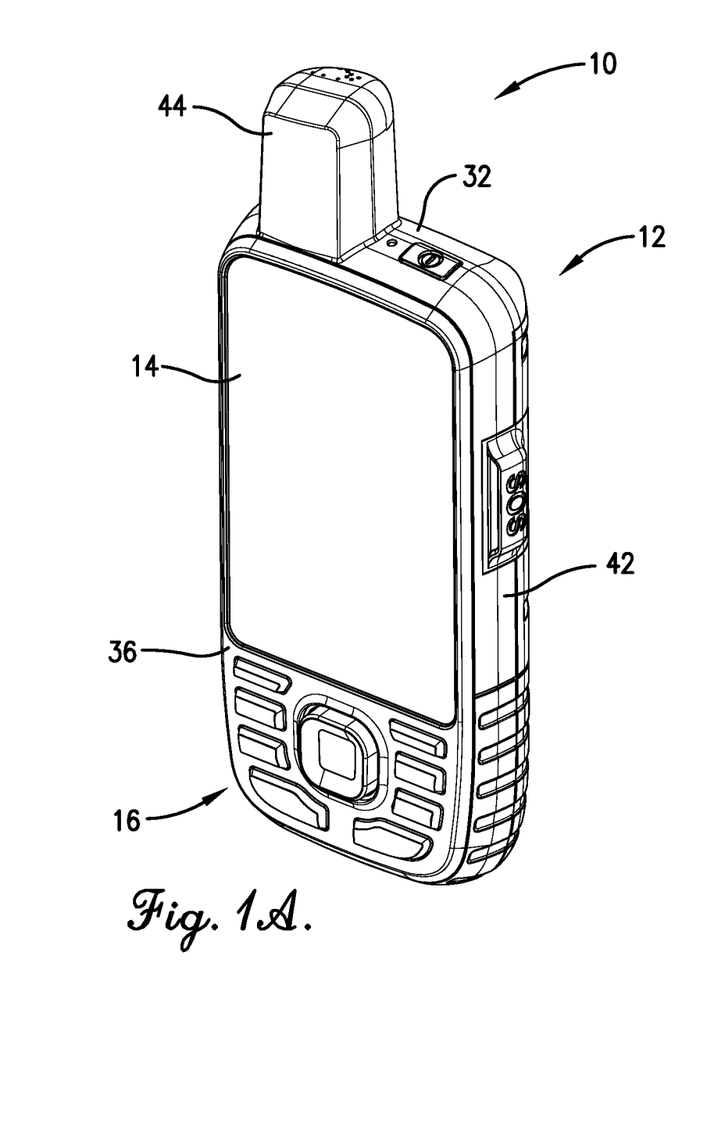
FIGS. 1A and 1B are a front and a rear perspective view of an electronic device including an antenna assembly, constructed in accordance with various embodiments of the present technology.
Figure 1B:
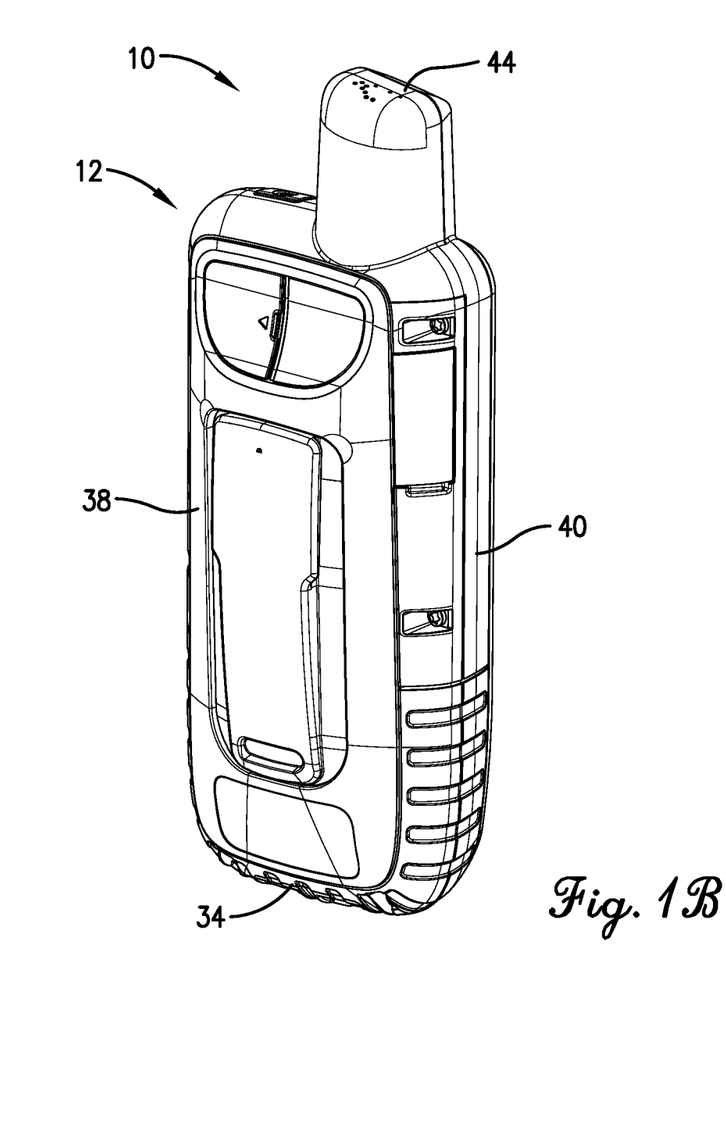
Figure 3:
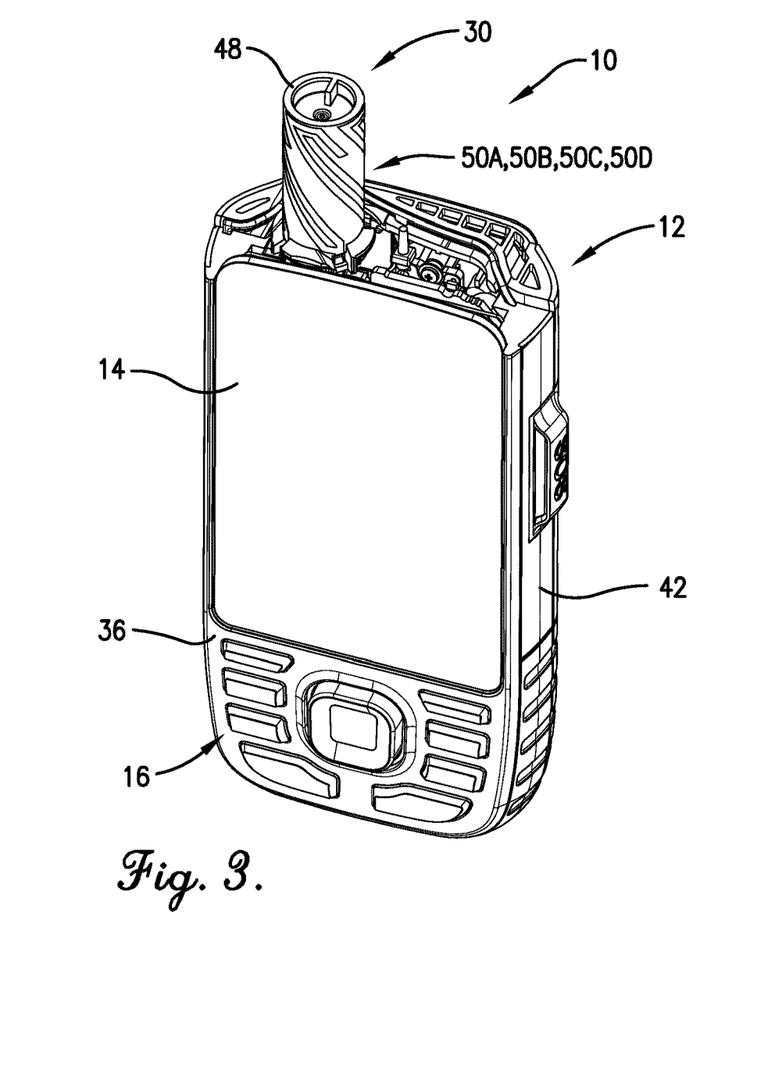
FIG. 3 is a front perspective view of the electronic device with a cap removed exposing the antenna assembly.
Figure 4:
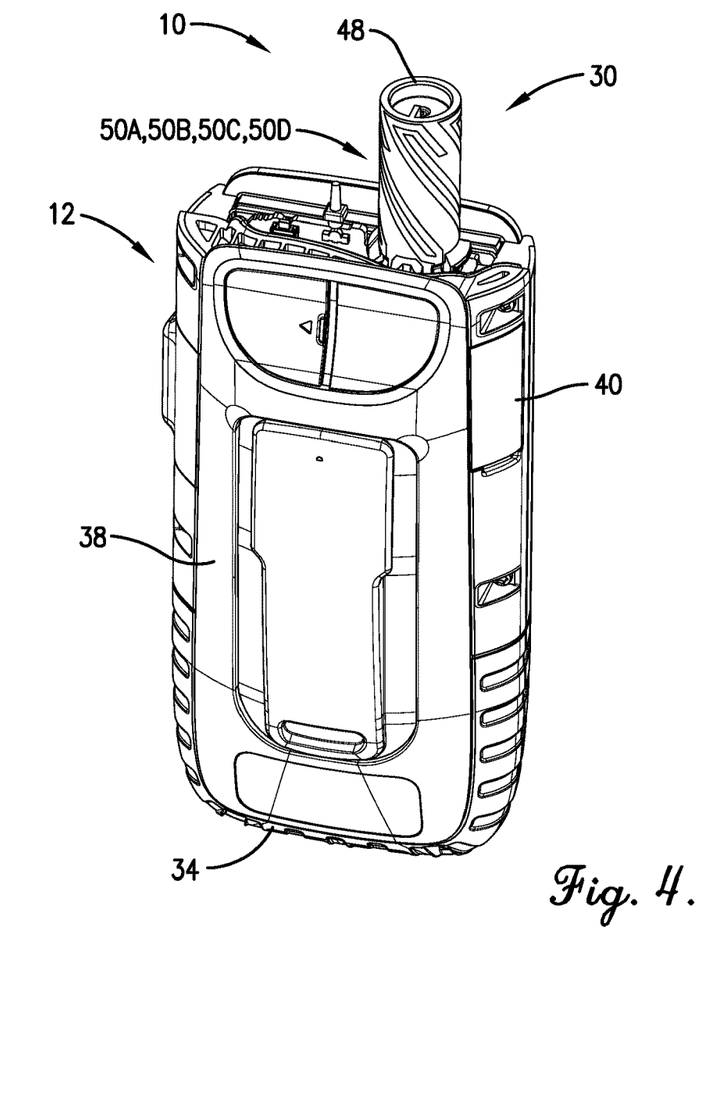
FIG. 4 is a rear perspective view of the electronic device with the antenna assembly visible.

The display 14, as shown in FIGS. 1A and 3, generally presents information to the user, such as current geolocation on a map, current track, current heading, trail information, time of day, and the like. The display 14 may be implemented in one of the following technologies: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. In exemplary embodiments that are shown in the figures, the display 14 has a rectangular or square shape. Other aspect ratios or shapes are possible. In various embodiments, all of the display 14, or at least a portion of the display 14, may include touch screen capabilities.

The user interface 16, as shown in FIGS. 1A and 3, generally allows the user to directly interact with the electronic device 10 and may include buttons, pushbuttons, knobs, jog dials, shuttle dials, directional pads, multidirectional buttons, switches, keypads, or the like, or combinations thereof. Furthermore, as discussed above, the display 14 may include a touch screen occupying the entire display 14, or a portion thereof, so that the display 14 functions as at least a portion of the user interface 16. The touch screen may allow the user to interact with the electronic device 10 by physically touching, swiping, or gesturing on areas of the display 14.

Figure 2:
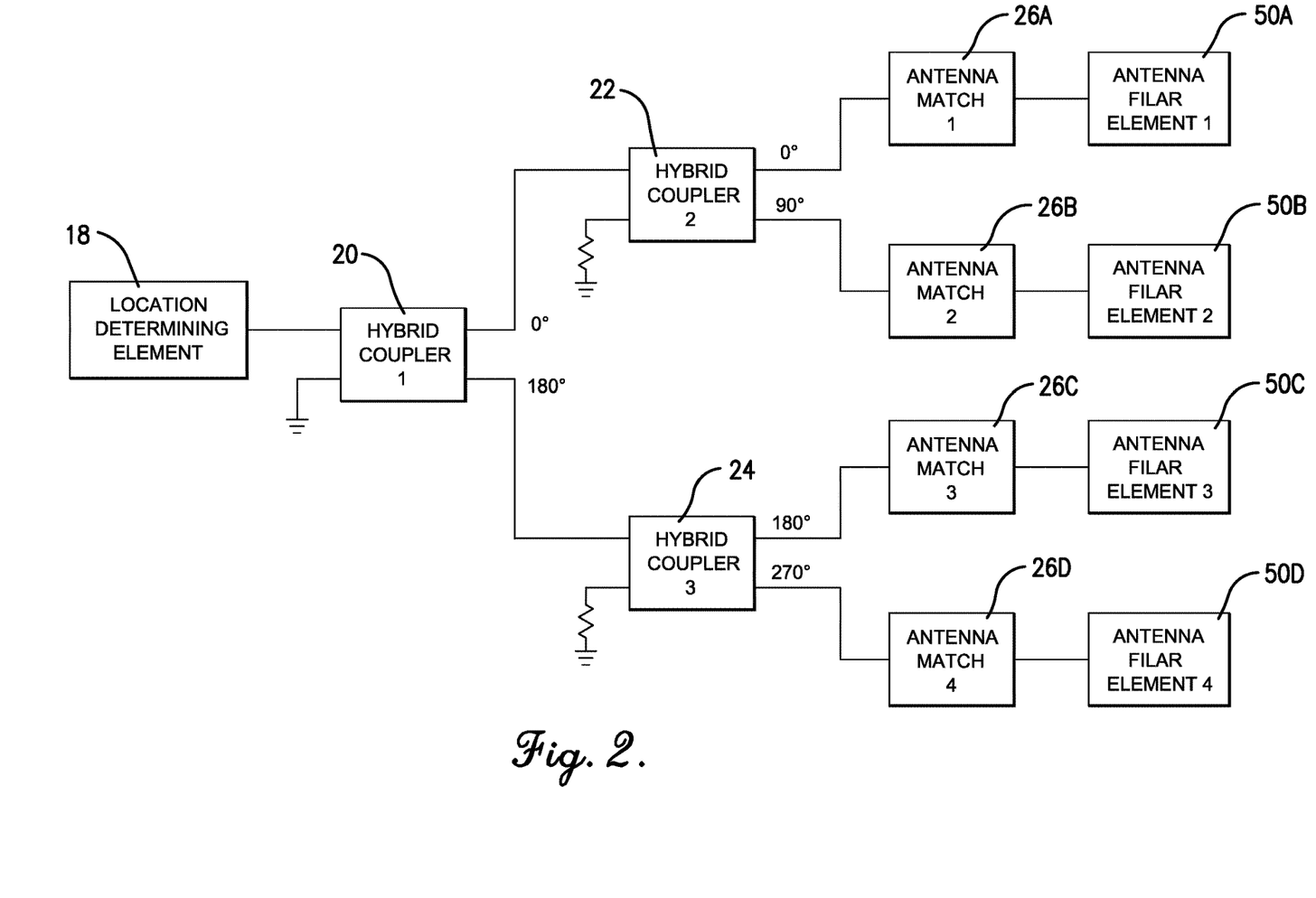
FIG. 2 is a schematic block diagram illustrating various electronic components of the electronic device.

The location determining element 18, as shown in FIG. 2, generally determines a current geolocation of the electronic device 10 and may receive and process radio frequency (RF) wireless signals from a multi-constellation global navigation satellite system (GNSS) such as the global positioning system (GPS) utilized in the United States, the GLONASS system utilized in Russia, the Galileo system utilized in Europe, or the like. The location determining element 18 may include satellite navigation receivers, processors, controllers, other computing devices, or combinations thereof, and memory. The location determining element 18 may process a location electronic signal communicated from the antenna assembly 30, which receives the location wireless signal from one or more satellites of the GNSS. The location wireless signal includes data from which geographic information such as the current geolocation is derived. The current geolocation may include coordinates, such as the latitude and longitude, of the current location of the electronic device 10.

In some embodiments, the location determining element 18 receives a dual-band location electronic signal from the antenna assembly 30. The dual-band location electronic signal includes a first frequency band component and a second frequency band component. An exemplary first frequency band is the GPS L5 band with a center frequency of approximately 1176.45 megahertz (MHz). An exemplary second frequency band is the GPS L1 band with a center frequency of approximately 1575.42 MHz. However, it is to be understood that the techniques disclosed herein may be applied to other first and second frequency bands. For example, the first frequency band may be the GPS L2 band with a center frequency of approximately 1227 MHz and the second frequency band may be the GPS L1 band with a center frequency of approximately 1575.42 MHz. Similarly, the first frequency band may be the GPS L5 band with a center frequency of approximately 1176.45 MHz and the second frequency band may be the GLONASS L1 band with a center frequency of approximately 1602 MHz. Similarly, the first frequency band may be the GPS L5 band with a center frequency of approximately 1176 MHz and the second frequency band may be an Iridium band with a center frequency of approximately 1621.25 MHz. Similarly, the first frequency band may be the GLONASS L2 band with a center frequency of approximately 1246 MHz and the second frequency band may be the GPS L1 band with a center frequency of approximately 1575.42 MHz. Similarly, the first frequency band may be the GLONASS L2 band with a center frequency of approximately 1246 MHz and the second frequency band may be the GLONASS L1 band with a center frequency of approximately 1602 MHz.

Although embodiments of the location determining element 18 may include a satellite navigation receiver, it will be appreciated that other location-determining technology may be used. For example, cellular towers or any customized transmitting radio frequency towers can be used instead of satellites may be used to determine the location of the electronic device 10 by receiving data from at least three transmitting locations and then performing basic triangulation calculations to determine the relative position of the device with respect to the transmitting locations. With such a configuration, any standard geometric triangulation algorithm can be used to determine the location of the electronic device 10. The location determining element 18 may also include or be coupled with a pedometer, accelerometer, compass, or other dead-reckoning components which allow it to determine the location of the device 10. The location determining element 18 may determine the current geographic location through a communications network, such as by using Assisted GPS (A-GPS), or from another electronic device. The location determining element 18 may even receive location data directly from a user.

Each hybrid coupler 20, 22, 24, as shown in FIG. 2, may adjust a phase of a first electronic signal with respect to a phase of a second electronic signal. In addition, the hybrid coupler 20, 22, 24 may convert a balanced electronic signal to an unbalanced electronic signal and vice-versa. The hybrid coupler 20, 22, 24 may include discrete components, such as resistors, capacitors, and inductors, transmission line conductors having a wavelength-related length, or combinations thereof which delay the electronic signal—effectively adjusting the phase of the electronic signal. In addition, or instead, the hybrid coupler 20, 22, 24 may include electronic circuitry such as transformers, coils, inductors, or the like, or combinations thereof. Each hybrid coupler 20, 22, 24 includes a first port that communicates the unbalanced electronic signal (including a signal component and electrical ground) and a second port that communicates the balanced electronic signal (including a first signal component and a second signal component that are electrically 90 degrees or 180 degrees out of phase with one another).

The first port of the first hybrid coupler 20 is electrically connected to the location determining element 18. The second port of the first hybrid coupler 20 is electrically connected to the first port of each of the second hybrid coupler 22 and the third hybrid coupler 24. The second port of the second hybrid coupler 22 is electrically connected to the first antenna match element 26A and the second antenna match element 26B. The second port of the third hybrid coupler 24 is electrically connected to the third antenna match element 26C and the fourth antenna match element 26D.

Each antenna match element 26A, 26B, 26C, 26D, as shown in FIG. 2, generally provides impedance matching to the antenna assembly 30 in order to allow maximum power transfer from the antenna assembly 30 through the hybrid couplers 20, 22, 24 to the location determining element 18. The antenna match element 26A, 26B, 26C, 26D may include impedance, reactive, and/or resistive passive components, such as resistors, capacitors, and inductors, forming LC circuits, filters, and the like, or combinations thereof. In various embodiments, the impedance may include 50 ohms. In some embodiments, one or more components may be electrically connected to electric ground. Each antenna match element 26A, 26B, 26C, 26D has a first port electrically connected to one of the hybrid couplers 20, 22, 24 and a second port electrically connected to a component of the antenna assembly 30, as discussed in more detail below. The configuration and the values of the components used in the antenna match elements 26A, 26B, 26C, 26D are set to provide impedance matching for the antenna assembly 30 for both the first frequency band and the second frequency band. In normal practice, the configuration and values of components are set once and not changed. In various embodiments, two-port parameters including S11, S12, S21, and S22 may be considered and/or calculated when determining the configuration and values of components of the antenna match elements 26A, 26B, 26C, 26D.

Figure 7:
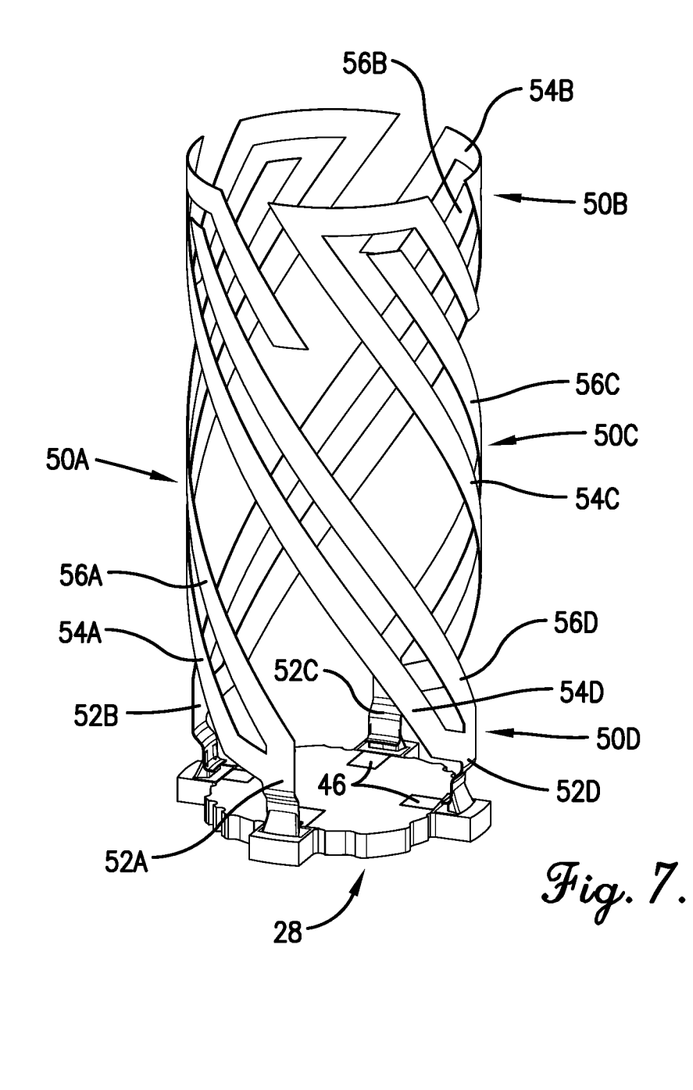
FIG. 7 is a perspective view of the antenna filar elements and a printed circuit board including a plurality of signal terminals.
Figure 8:
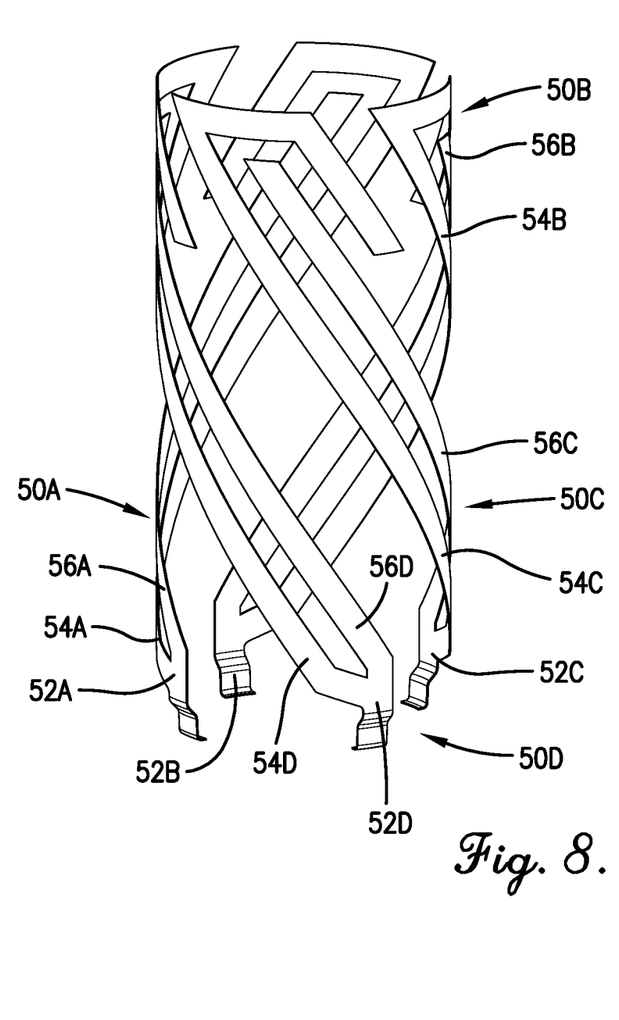
FIG. 8 is a perspective view of the antenna filar elements.
Figure 9:
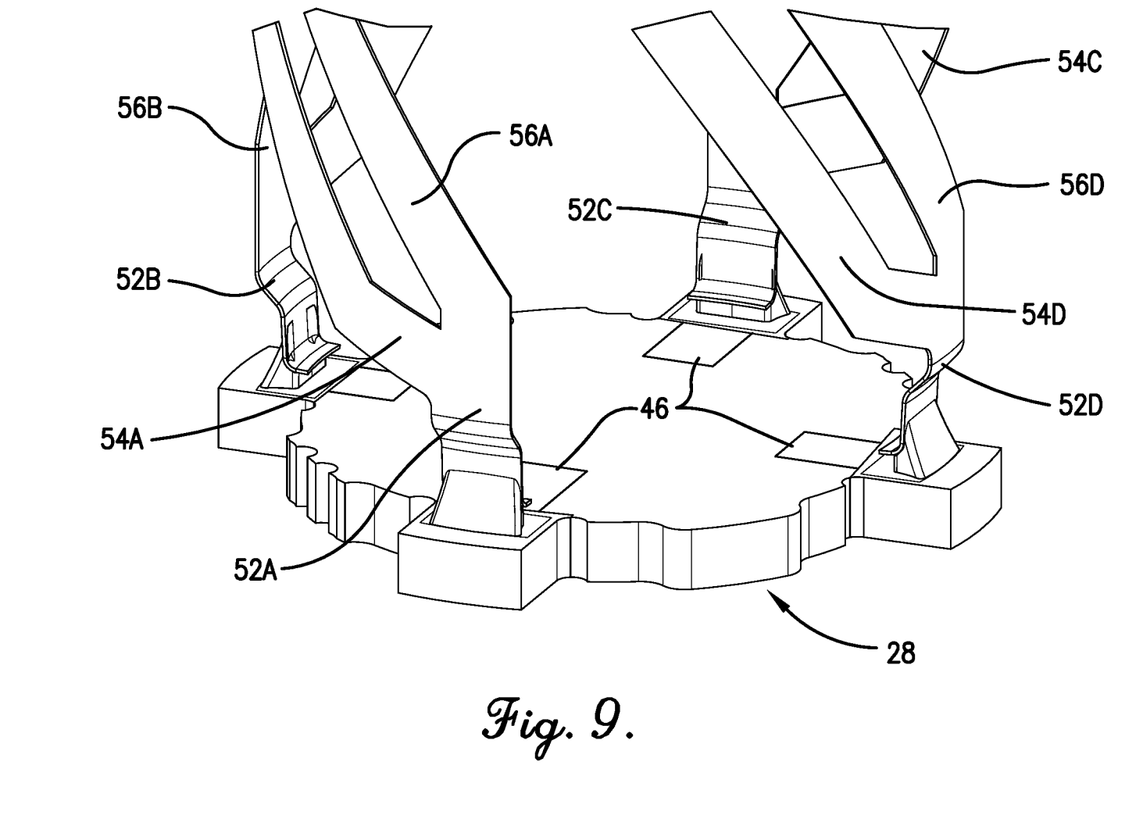
FIG. 9 is a perspective view of the antenna filar elements and the printed circuit board.

The printed circuit board 28, as shown in FIGS. 7 and 9, generally provides the electrical connection between the antenna assembly 30, the antenna match elements 26A, 26B, 26C, 26D, and the hybrid couplers 20, 22, 24. The printed circuit board 28 may be constructed with a first, or top, surface and an opposing second, or bottom, surface. The printed circuit board 28 may also include multiple electrically conductive layers with a top conductive layer placed on the first surface, a bottom conductive layer placed on the second surface, one or more inner conductive layers positioned between the first and second surfaces, and an insulating layer between each pair of adjacent conductive layers. The insulating layers may be formed from rigidized material that includes various combinations of fiberglass, woven glass, matte glass, cotton paper, phenolic cotton paper, polyester, epoxies, epoxy resins, and the like. The conductive layers may be formed from metals typically including copper, but also including nickel, aluminum, gold, silver, palladium, zinc, tin, lead, and the like. Each conductive layer may include one or more electrically conductive traces. The conductive traces may be utilized to communicate electronic signals or may be electrically connected to electric power or ground. Each conductive layer may additionally or alternatively include one or more signal, power, or ground pads or terminals, full or partial electric power planes, or full or partial electric ground planes. In addition, the printed circuit board 28 may include plated through hole vias, blind vias, buried vias, and the like. The electronic components may be implemented in packages which are mounted, or retained, on the top surface, the bottom surface, or both surfaces. The electronic components may communicate with one another through electronic signal traces.

The printed circuit board 28 retains the antenna match elements 26A, 26B, 26C, 26D and the hybrid couplers 20, 22, 24. The antenna assembly 30 connects, both physically and electrically, to the printed circuit board 28. In addition, the printed circuit board 28 includes a plurality of signal terminals 46 that electrically connect to components of the antenna assembly 30, as described in more detail below.

Figure 5:
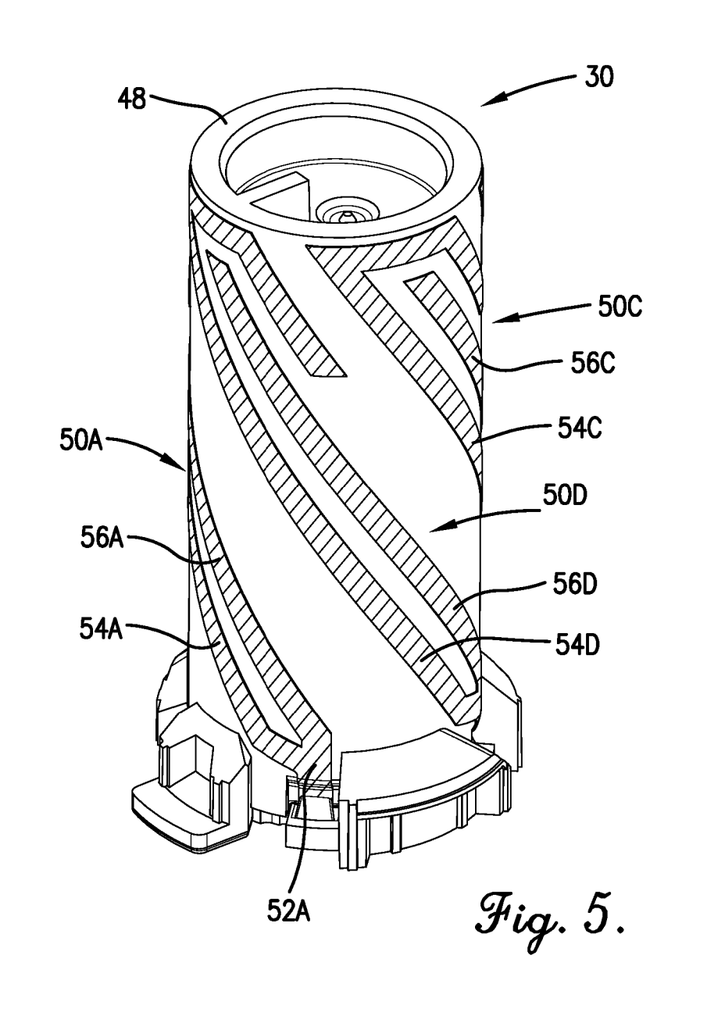
FIG. 5 is a front perspective view of the antenna assembly including a substrate and four antenna filar elements.
Figure 6:
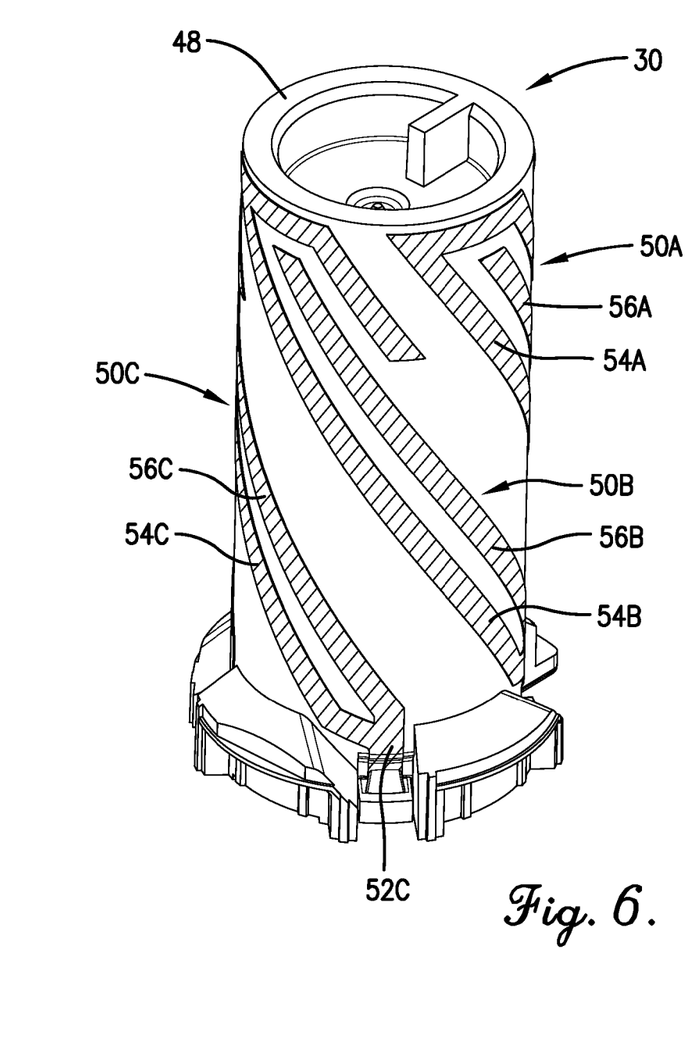
FIG. 6 is a rear perspective view of the antenna assembly.

The antenna assembly 30, as shown in FIGS. 5 and 6, generally performs a conversion between wireless signals and electronic signals. That is, the antenna assembly 30 receives one or more wireless signals and communicates one or more corresponding electronic signals as an output. The antenna assembly 30 includes a substrate 48, and four antenna filar elements 50A, 50B, 50C, 50D.

The substrate 48, as shown in FIGS. 5 and 6, has a generally cylindrical shape formed by a single circumferential sidewall and includes an outer surface, an upper edge, and a lower edge. The substrate 48 may be formed from polymers such as polyimide flexible material or plastics.

Each antenna filar element 50A, 50B, 50C, 50D, as shown in FIGS. 5-9, is formed from electrically conductive materials, such as metals or metal alloys and includes a base 52, a first arm 54, and a second arm 56. (The base 52 is labeled in the figures with reference numerals 52A, 52B, 52C, and 52D according to its associated antenna filar element. The first arm 54 is labeled in the figures with reference numerals 54A, 54B, 54C, and 54D according to its associated antenna filar element. The second arm 56 is labeled in the figures with reference numerals 56A, 56B, 56C, and 56D according to its associated antenna filar element.) The base 52 has a polygon, or multi-sided shape, such as a triangle, a square, a rectangle, a trapezoid, a pentagon, a hexagon, or the like. The base 52 of each antenna filar element is electrically connected to a successive one of the signal terminals 46 on the printed circuit board 28. The first arm 54 is generally elongated and includes a first end and an opposing second end. The first end of the first arm 54 is electrically connected to the base 52 on one side. The first arm 54 is configured to receive wireless signals in the first frequency band and has a length that varies according to, is proportional to, or corresponds to, one or more of a quarter wavelength of a center frequency of the first frequency band. The second arm 56 is generally elongated and includes a first end and an opposing second end. The first end of the second arm 56 is electrically connected to the base 52 on another side. The second arm 56 is configured to receive wireless signals in the second frequency band and has a length that varies according to, is proportional to, or corresponds to, one or more of a quarter wavelength of a center frequency of the second frequency band. Exemplary embodiments of the antenna assembly 30 are configured to received GNSS signals, specifically GPS signal. Thus, the first arm 54 has a length that varies according to, is proportional to, or corresponds to, one or more of a quarter wavelength of the center frequency of the GPS L5 band, which is approximately 1176.45 MHz. The second arm 56 has a length that varies according to, is proportional to, or corresponds to, one or more of a quarter wavelength of the center frequency of the GPS L1 band, which is approximately 1575.42 MHz. With this exemplary configuration, the first arm 54 of each antenna filar element 50A, 50B, 50C, 50D has a length that is greater than the second arm 56. In addition, the implementation of each filar element 50A, 50B, 50C, 50D to include a first arm 54 configured to receive wireless signals in a first frequency band and a second arm configured to receive wireless signals in a second frequency band results in the antenna assembly 30 being a dual-band antenna assembly 30.

As stated, the antenna assembly 30 receives wireless signals in the first frequency band and the second frequency band, which, in an exemplary configuration, includes the GPS L5 band signal and the GPS L1 band signal. The antenna assembly 30 accordingly communicates, or outputs, a corresponding electronic signal with a first frequency band component and a second frequency band component. In the exemplary configuration, the electronic signal includes the GPS L5 band signal component and the GPS L1 band signal component, which includes the data and information of both the L5 band and the L1 band.

The antenna filar elements 50A, 50B, 50C, 50D are positioned on the outer surface of the substrate 48 such that the lengths of the first arm 54 and the second arm 56 of each antenna filar element 50A, 50B, 50C, 50D are oriented at an angle between 0 degrees and 90 degrees with respect to a longitudinal axis of the substrate 48. This configuration results in the antenna filar elements 50A, 50B, 50C, 50D forming a quad helical array on the substrate 48 and being able to receive the right-hand circularly polarized (RHCP) GPS signals. As shown in FIGS. 5-8, the first arm 54 and the second arm 56 of each antenna filar element 50A, 50B, 50C, 50D extend from the lower edge of the substrate 48 to the upper edge of the substrate 48 in a leftward direction. When viewed from the top of the substrate 48, the first arm 54 and the second arm 56 of each antenna filar element 50A, 50B, 50C, 50D extend in a clockwise direction from the lower edge of the substrate 48 to the upper edge of the substrate 48.

The antenna filar elements 50A, 50B, 50C, 50D may be deposited, printed, patterned and etched, or the like on the outer surface of the substrate 48. In exemplary embodiments, the substrate 48 is manufactured using a polycarbonate material and the filar antenna elements 50A, 50B, 50C, 50D are formed on the substrate 48 using the laser direct structuring (LDS) process.

The inventors have found that, when implementing this helical configuration of the dual-band antenna filar elements 50A, 50B, 50C, 50D on the substrate 48, an improvement in the accuracy of determining a geolocation of the electronic device 10 is achieved by dividing the first arm 54 of each antenna filar element 50A, 50B, 50C, 50D into multiple sections such that some sections of the first arm 54 wrap around the second end of the second arm 56. Thus, the first arm 54 of each antenna filar element 50A, 50B, 50C, 50D includes a first section, a second section, and a third section. The first section overlaps the first end of the first arm 54. The second section is connected to the first section and the third section and is positioned therebetween. The third section overlaps the second end of the first arm 54. In addition, there is a first bend between the first section and the second section and a second bend between the second section and the third section. The first section is oriented to be generally parallel to the second arm 56. The second section is oriented to be generally parallel (and adjacent) to the upper edge of the substrate 48. The third section is oriented to be generally parallel to a portion of the first section and to a portion of the second arm 56. The first section is positioned adjacent to one side of the second arm 56. The second section is positioned across from the second end of the second arm 56. The third section is positioned adjacent to a portion of the opposing side of the second arm 56.

Figure 10:
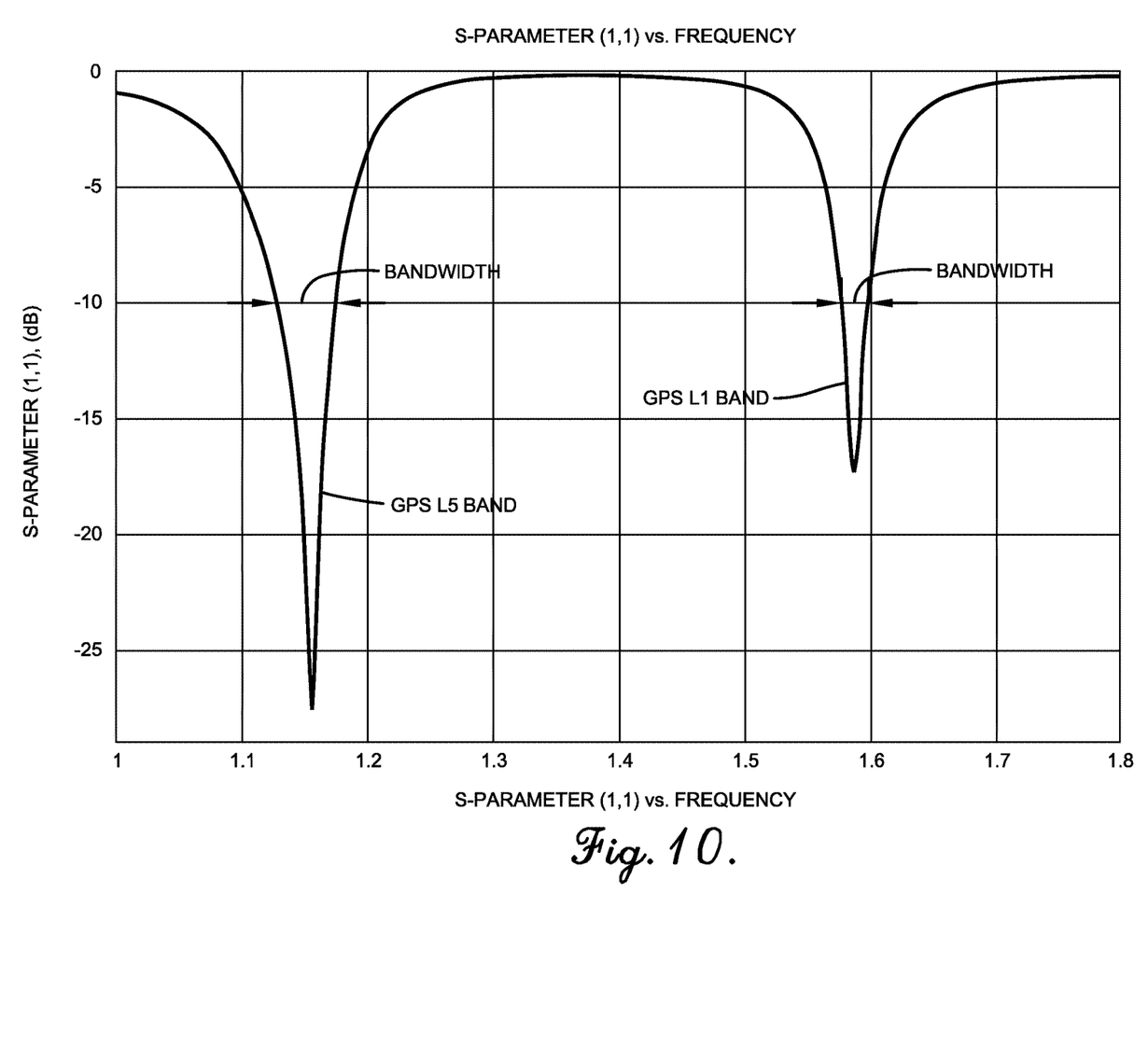
FIG. 10 is a plot of the S-parameter (1,1) vs. frequency for the antenna assembly.

The positioning of the sections of the first arm 54 to circumscribe, encircle, or wrap around, the second end of the second arm 56 results in a capacitive coupling of the first arm 54 with the second arm 56 with an additional shunt capacitance between the first arm 54 and the second arm 56 that affects the current distribution within the arms 54, 56 as well as the impedance profile of the arms 54, 56. The capacitive coupling of the first arm 54 with the second arm 56 also allows the antenna assembly 30 to communicate, or output, the electronic signal with the appropriate bandwidth. Specifically, the capacitive coupling has been found to increase the bandwidth, particularly of the GPS L5 band signal component of the output electronic signal to 50 MHz (4.2% FBW), which satisfies and exceeds the GPS standard requirements (2.1% FBW). Referring to FIG. 10, the S-Parameter (1,1) of the output of the antenna assembly 30 vs. frequency is shown. As can be seen, the bandwidth of the GPS L1 band is approximately 30 MHz at −10 dB, while the bandwidth of the GPS L5 band is approximately 50 MHz at −10 dB.

The electronic device 10 may operate, at least in part, as follows. The antenna assembly 30 receives the GPS L1 band and L5 band wireless signals from satellites of the GPS network. The antenna assembly 30 converts the wireless signals to a corresponding location electronic signal which includes the GPS L1 band and L5 band components. Each antenna filar element 50A, 50B, 50C, 50D communicates, or outputs, the location electronic signal through its associated antenna match element 26A, 26B, 26C, 26D. The location electronic signal from each antenna filar element 50A, 50B, 50C, 50D then propagates through the network of hybrid couplers 20, 22, 24, which adjusts the phase of each location electronic signal such that the location electronic signal from each antenna filar element 50A, 50B, 50C, 50D should be 90 degrees out of phase with the location electronic signal from its adjacent antenna filar element 50A, 50B, 50C, 50D. For example, after propagating through the network of hybrid couplers 20, 22, 24, the location electronic signal from the first antenna filar element 50A has a phase of 0 degrees, the location electronic signal from the second antenna filar element 50B has a phase of 90 degrees, the location electronic signal from the third antenna filar element 50C has a phase of 180 degrees, and the location electronic signal from the fourth antenna filar element 50D has a phase of 270 degrees. This phase arrangement of the location electronic signal from each antenna filar element 50A, 50B, 50C, 50D is necessary for the location electronic signal to be properly processed by the location determining element 18 as Right Hand Circular Polarization (RHCP). Before being received by the location determining element 18, the location electronic signal may be further conditioned or prepared for processing by electronic circuitry such as amplifiers, filters, analog to digital converters (ADCs), and the like. The location determining element 18 may receive the location electronic signal and process the GPS L1 band and L5 band components to determine the current geolocation of the electronic device 10.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A dual-band antenna assembly for use with an electronic device, the dual-band antenna assembly comprising:

a substrate including a side wall forming a cylindrical shape;

first, second, third, and fourth antenna filar elements positioned diagonally on the side wall and equally separated from one another, each antenna filar element formed from electrically conductive material and including a first end and an opposing second end, each antenna filar element further including a first arm configured to receive wireless signals in a first frequency band and a second arm having a first end and an opposing second end, the second arm electrically connected to the first arm, positioned adjacent to the first arm, and configured to receive wireless signals in a second frequency band, the first arm having a length that is greater than a length of the second arm, and the first arm having a portion which wraps around the second end of the second arm thereby capacitively coupling the portion of the first arm with the second arm;

wherein the first arm of each antenna filar element includes a first section oriented in a first direction, a second section oriented in a second direction that is roughly parallel to an upper edge or a lower edge of the substrate, and a third section oriented in a third direction that is roughly parallel to the first direction; and wherein the first section of the first arm is positioned adjacent to a first side of the second arm, the second section of the first arm is positioned across from the second end of the second arm, and the third section of the first arm is positioned adjacent to a second side of the second arm, opposite the first side.

2. The dual-band antenna assembly of claim 1, wherein the portion of the first arm curves around the second end of the second arm.

3. The dual-band antenna assembly of claim 1, wherein an impedance bandwidth of the first frequency band is wider than an impedance bandwidth of the second frequency band.

4. The dual-band antenna assembly of claim 1, wherein the first, second, third, and fourth antenna filar elements are positioned 90 degrees apart from one another along a circumference of the substrate.

5. The dual-band antenna assembly of claim 1, further comprising a printed circuit board including:
a first signal terminal electrically coupled with the first end of the first antenna filar element,
a second signal terminal electrically coupled with the first end of the second antenna filar element,
a third signal terminal electrically coupled with the first end of the third antenna filar element, and
a fourth signal terminal electrically coupled with the first end of the fourth antenna filar element;
wherein the substrate is positioned on an upper surface of the printed circuit board.

6. The dual-band antenna assembly of claim 5, wherein each of the first, second, third, and fourth antenna filar elements further comprise a base extending from a first end of the first arm and the first end of the second arm to the first, second, third, and fourth signal terminals, respectively.

7. The dual-band antenna assembly of claim 1, wherein the length of the first arm is one quarter wavelength of a center frequency of the first frequency band and the length of the second arm is one quarter wavelength of a center frequency of the second frequency band.

8. The dual-band antenna assembly of claim 1, wherein the first, second, third, and fourth antenna filar elements are positioned such that the antenna assembly is right-hand circularly polarized at the first frequency band and the second frequency band.

9. The dual-band antenna assembly of claim 1, wherein the first frequency band is centered at approximately 1176 MHz and the second frequency band is centered at approximately 1575 MHz.

10. A dual-band antenna assembly for use with an electronic device, the dual-band antenna assembly comprising:
a substrate including a side wall forming a cylindrical shape; and
first, second, third, and fourth antenna filar elements positioned diagonally on the side wall and equally separated from one another, each antenna filar element including a first end and an opposing second end, formed from electrically conductive material, and including a first arm configured to receive wireless signals in a first frequency band and a second arm having a first end and an opposing second end,
the second arm electrically connected to the first arm, positioned adjacent to the first arm, and configured to receive wireless signals in a second frequency band, such that a length of the first arm is one quarter wavelength of a center frequency of the first frequency band and a length of the second arm is one quarter wavelength of a center frequency of the second frequency band,
the first arm including a first section positioned adjacent to a first side of the second arm, a second section positioned across from the second end of the second arm, and a third section positioned adjacent to a second side of the second arm, opposite the first side;
wherein the second section and the third section of the first arm are wrapped around the second end of the second arm thereby capacitively coupling the second section and the third section of the first arm of each antenna filar element with the second arm.

11. The dual-band antenna assembly of claim 10, wherein the first section of the first arm of each antenna filar element is oriented in a first direction, the second section is oriented in a second direction that is roughly parallel to an upper edge or a lower edge of the substrate, and the third section is oriented in a third direction that is roughly parallel to the first direction.

12. The dual-band antenna assembly of claim 10, wherein the second section and the third section of the first arm curve around the second end of the second arm.

13. The dual-band antenna assembly of claim 10, further comprising a printed circuit board including:
a first signal terminal electrically coupled with the first end of the first antenna filar element,
a second signal terminal electrically coupled with the first end of the second antenna filar element,
a third signal terminal electrically coupled with the first end of the third antenna filar element, and
a fourth signal terminal electrically coupled with the first end of the fourth antenna filar element;
wherein the substrate is positioned on an upper surface of the printed circuit board.

14. The dual-band antenna assembly of claim 13, wherein each of the first, second, third, and fourth antenna filar elements further comprise a base extending from a first end of the first arm and the first end of the second arm to the first, second, third, and fourth signal terminals, respectively.

15. An electronic device for determining a geolocation from a global positioning system signal, the electronic device comprising:
a dual-band antenna assembly including
a substrate including a side wall forming a shape of a cylinder;
first, second, third, and fourth antenna filar elements positioned diagonally on the side wall and equally separated from one another, each antenna filar element formed from electrically conductive material and including a first end and an opposing second end, each antenna filar element further including a first arm configured to receive wireless signals in a first frequency band and a second arm having a first end and an opposing second end,
the second arm electrically connected to the first arm, positioned adjacent to the first arm, and configured to receive wireless signals in a second frequency band, the first arm having a length that is greater than a length of the second arm, and the first arm having a portion which wraps around the second end of the second arm thereby capacitively coupling the portion of the first arm with the second arm;
wherein the dual-band antenna assembly communicating a location electronic signal from each antenna filar element, each location electronic signal including a first frequency band component and a second frequency band component; and a location determining element configured to determine the geolocation of the electronic device from the first frequency band component and the second frequency band component of the location electronic signal.

16. The electronic device of claim 15, further comprising a plurality of hybrid couplers configured to receive the location electronic signal from each antenna filar element and adjust a phase of the location electronic signals such that the phase of the location electronic signal of each antenna filar element is shifted by 90 degrees with respect to the phase of the location electronic signal of the two adjacent antenna filar elements.

17. The electronic device of claim 15, wherein the first arm of each antenna filar element includes a first section oriented in a first direction, a second section oriented in a second direction that is roughly parallel to an upper edge or a lower edge of the substrate, and a third section oriented in a third direction that is roughly parallel to the first direction.

18. The electronic device of claim 15, wherein a first section of the first arm is positioned adjacent to a first side of the second arm, a second section of the first arm is positioned across from the second end of the second arm, and a third section of the first arm is positioned adjacent to a second side of the second arm, opposite the first side.

* * * * *